(No Model.) 2 Sheets—Sheet 1.
J. J. NORWELL.
MACHINE FOR AUTOMATICALLY FEEDING LACING HOOKS TO SETTING DEVICES.
No. 512,210. Patented Jan. 2, 1894.
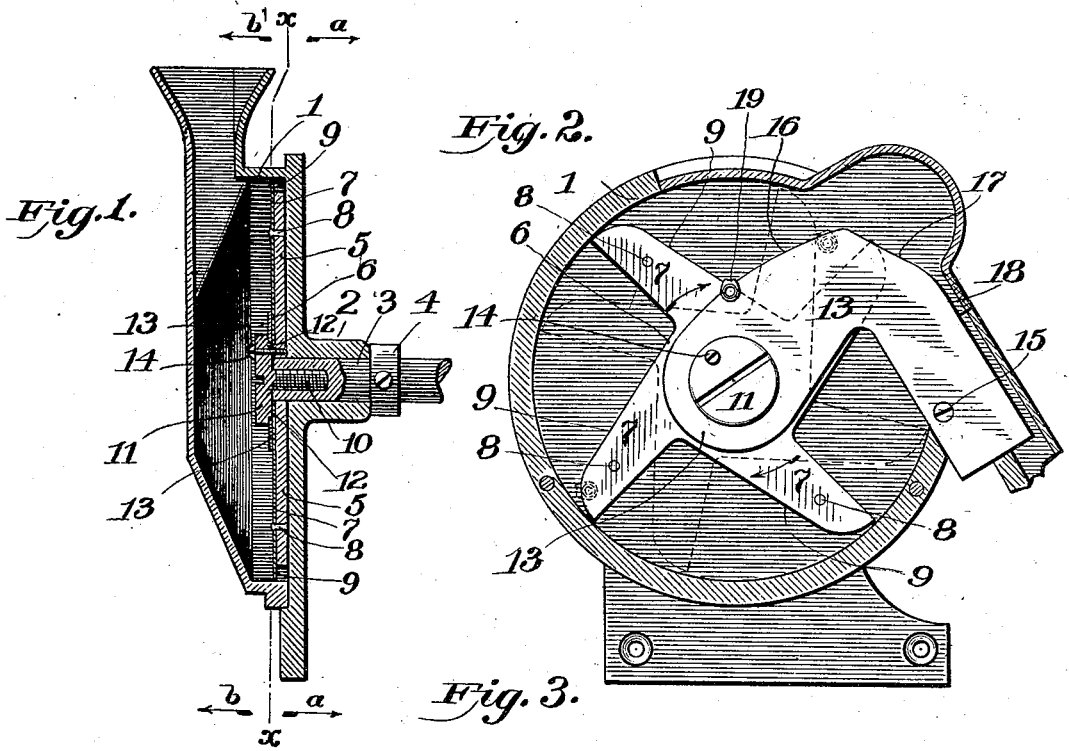
WITNESSES:
J. F. Finch.
A. S. Meloy.
INVENTOR
J. J. Norwell
BY F. W. Smith Jr.
ATTORNEY (No Model.) 2 Sheets—Sheet 2.
J. J. NORWELL.
MACHINE FOR AUTOMATICALLY FEEDING LACING HOOKS
TO SETTING DEVICES.
No. 512,210. Patented Jan. 2, 1894.
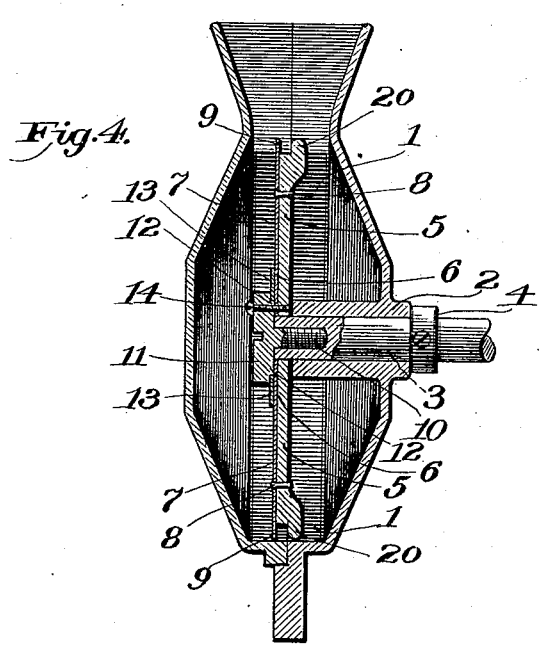
Fig. 4.
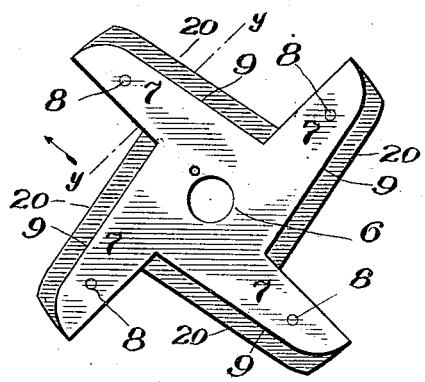
Fig. 5.
Fig. 6.
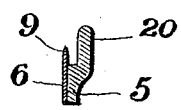
WITNESSES:
INVENTOR
J. J. Norwell
BY
ATTORNEY

UNITED STATES PATENT OFFICE.

JOHN J. NORWELL, OF BRIDGEPORT, CONNECTICUT, ASSIGNOR TO THE SMITH & EGGE MANUFACTURING COMPANY, OF SAME PLACE.

MACHINE FOR AUTOMATICALLY FEEDING LACING-HOOKS TO SETTING DEVICES.

SPECIFICATION forming part of Letters Patent No. 512,210, dated January 2, 1894.

Application filed January 18, 1893. Serial No. 458,882. (No model.)

*To all whom it may concern:*

Be it known that I, JOHN J. NORWELL, a citizen of the United States, residing at Bridgeport, in the county of Fairfield and State of Connecticut, have invented certain new and useful Improvements in Mechanism for Automatically Selecting and Delivering Lacing-Hooks onto a Chute; and I do hereby declare the following to be a full, clear, and exact description of the invention, such as will enable others skilled in the art to which it appertains to make and use the same.

My invention relates to machines for setting lacing hooks, but more especially has reference to devices for picking up such hooks from a mass of hooks in a hopper and delivering them in proper position upon the usual chute by which latter they are conveyed to the hook setting mechanism. I have therefore not deemed it necessary to show or describe any of the parts of a hook setting machine proper, since my present improvement may be used in connection with any such machine.

In the accompanying drawings,—Figure 1 is a vertical sectional elevation of my improvement; Fig. 2, a section at the line *x*, *x*, of Fig. 1, looking in the direction of the arrows *a*, *a*; Fig. 3, a section also at said line *x*, *x*, but looking in the direction of the arrows *b*, *b*; Fig. 4, a view similar to Fig. 1, but showing my invention applied in the instance of blades which are remote from the wall of the hopper; Fig. 5, a detail elevation of the blade wheel shown in Fig. 4, and Fig. 6, a section at the line *y*, *y*, of Fig. 5.

Similar numbers denote like parts in the several figures of the drawings.

1 is the hopper whose shape is round in vertical section as shown at Fig. 2, and which may be bolted or otherwise secured to the frame of a hook setting machine. The rear face of the hopper is provided with a hub 2 within which extends a rotatary shaft 3, the latter having secured thereto a collar 4 immediately beyond the hub whereby said shaft can have no inward movement, as will be hereinafter more fully set forth. The shaft projects slightly within the hopper and has thereon a gage-plate 5 and a wheel 6 both of which I will now describe in detail. The wheel 6 has preferably a plurality of blades 7 which extend radially to the inner circumference of the hopper, the shaft 3 and said circumference being concentric. These blades are reinforced on their backs by the plate 5 secured thereto by pins 8 and whose shape is similar to that of said blades. This plate lies closely against the inner wall of the hopper and separates the blades from said wall by a space sufficient to admit the heads of the lacing hooks but not the eyelets thereof, and the edges 9 of the blades extend beyond the plate.

10 is a screw having a large head 11 and a diminished concentric shoulder 12 on the inside of said head. This screw is driven within the end of the shaft 3 after the heel end of the guide or raceway 13 has been placed loosely around said shoulder, whereby the wheel 6 and said guide are confined in their assembled position. A screw pin 14 driven through the head 11 and shoulder 12 into the wheel 6 and plate 5 binds said parts rigidly together, so that it will be readily understood that said parts will revolve with the shaft 3. The guide 13 is a thin piece of sheet metal and it lies close to the wheel 6, and the combined thickness of said guide and blades is a trifle less than the width of the space beneath the heads of the hooks; in other words the heads of said hooks would loosely fit over a metal plate whose thickness was equal to the combined thicknesses of the guide and blades. 15 is a pin which secures said guide to the hopper. The upper edge of the guide is upwardly and forwardly inclined as seen at 16 and then slightly declined as seen at 17 toward that part 18 of said guide which transfers the hooks to the main chute (not shown) of an ordinary hook setting machine, the said parts 16, 17, and 18 forming an angular guiding-edge as clearly shown in Fig. 2.

The operation of my improvement is as follows: As the blades revolve (in the direction of the arrows thereon) through the mass of hooks in the hopper, the edges 9 of said blades will pick up the hooks and carry them up to that point where said edges travel close to the incline 16 of the guide, when said hooks will be transferred on to said incline and propelled therealong by the said edges, the latter being rounded at the outer ends of the blades to facilitate this driving of the hooks. The hooks are thus driven by the blades on to the incline 17 and slide along the latter down the incline 18. As before stated the blades extend radially to the wall of the hopper, and the object of this is to prevent the wedging of hooks between the ends of the blades and the hopper, and also to insure the retention of the hooks on the blades. The inclines of the guide have such relation to each other and to the edges of the blades which deliver the hooks, that the latter are first driven up an incline and then by an easy descent are allowed to slide on to the main part of the guide.

It will be observed, by reference to Fig. 2, and in the particular instance of the hook 19, that the latter is transferred to the incline 16 at a time when the edge of the transferring blade is only slightly elevated above a horizontal plane, and this insures the driving of the hooks by a steady strong movement.

Heretofore devices have been constructed for feeding hooks, said devices comprising a rotatory or reciprocatory blade which when in a certain position is in alignment with the main chute. A great disadvantage attaches to such devices, in that immediately before the blade aligns with the chute the hooks frequently slide from the blade and clog the chute; also the blade is constantly getting out of true so that it will not align perfectly with the chute, and whenever this happens the feeding of the hooks will cease. Again, the transfer of hooks from such blade directly on to the chute necessitates such a rapid sliding of the hooks, that, especially when there are several hooks on the blade one behind the other, said hooks will jump from the blade back into the hopper or else will pile up and clog the chute.

The delivery of the hooks on to a guide inclined as shown constitutes a continuous feed, and every hook picked up by the blades is delivered to the main chute. In fact this feeding device must be speeded abnormally low, since otherwise it will supply the hooks at a rate faster than the setting machine can use them. In this connection it might be well to state, that, in the present instance, there are four blades, and, therefore, four separate deliveries of hooks on the guide during one revolution of the shaft, and moreover, this shaft revolves continuously, there being no necessity for a dwell at the time of such deliveries as is the case with similar machines heretofore used. Therefore, it will be clear that a single blade is within the scope of my invention since the hooks would thereby be delivered precisely in the same manner as in the instance of the four blades, only the supply of hooks to the guide would be less in a given time.

The upward and downward inclinations of the guide afford an additional advantage, in that when the downward incline is full of hooks, a surplusage of additional hooks will be driven up the incline 16 until they come in contact with the uppermost hook on the incline 18, and such contact will cause the surplus hooks to be lifted from the incline 16 whence they will fall back into the hopper.

With reference to the guide I will say that the edges 16, 17, may be in one unbroken curve, if desired, and that the part 18 may in reality be the main chute brought into proper alignment with the edge 17; but I prefer the construction shown since it is readily made and assembled and can be used in connection with any hook setting machine which employs a chute for delivering the hooks.

The plate 5 may be omitted, since a small hub or collar around the shaft 3 between the wheel 6 and the hopper-wall will serve to keep the blades 7 at the proper distance from said wall; but I prefer to use this plate in the manner shown, since it reinforces the blades and the latter will not become bent or thrown out of true. Also my invention does not depend upon the hopper wall as an auxiliary, since gage fingers 20 may be extended from the rear of the plate 5 upward above the edges of the blades throughout their length, and the wheel 6 may then revolve in a plane midway between the side walls of the hopper, all as shown at Figs. 4 and 5. In such a construction, it will, of course, be understood that the space between the blades and said fingers 20 is sufficient to admit the heads of the hooks but not the eyelets thereof. I do not lay claim however, to any construction of parts whereby the hooks are picked up by the blades with the eyelets of said hooks all extending in one direction, for the reason that such construction is not new, and, moreover, I have associated my invention with such construction merely to illustrate a practical way of utilizing my improvement.

The office of my invention is to deliver the hooks on to the guide, and it is obvious, that, if said hooks are not so delivered their eyelets all extend in one direction. Ordinary mechanical devices known in the prior art or even specially contrived, may be employed to remove hooks that are not properly assembled when picked up by the blades, and allow them to drop back into the hopper.

I claim—

1. In a machine of the character described, a stationary hopper, a wheel therein having radial blades, and an independent guide or raceway within the hopper having a guiding-edge onto which the hooks are fed by the said blades in a predetermined position.

2. In a machine of the character described, a hopper, a wheel therein having radial blades, and an independent guide arranged within the hopper in a vertical plane contiguous to the field of travel of said blades, said guide having an inclined upper edge onto which the hooks are fed by the said blades.

3. In a machine of the character described, a hopper, a wheel therein having radial blades, and a guide carried by the wheel-shaft and having an inclined upper edge onto which the hooks are fed by the said blades.

4. In a machine of the character described, a hopper, a wheel therein having radial blades formed with rounded outer ends, and a guide within the hopper having an inclined upper edge.

5. In a machine for automatically delivering lacing hooks onto a chute, the combination of the hopper whose inner wall is of a circular shape in vertical section, and within which hopper the mass of hooks is placed, the rotatory shaft within the hopper, the wheel on said shaft and having blades which extend radially to the circular wall of the hopper, and the guide fixed within the hopper and having its rear end close to the field of travel of said blades, and its upper edge forming a raceway said blades and chute being in contiguous vertical planes, each blade being of a uniform thickness which combined with the thickness of the chute is less than the width of the space immediately beneath the head of the hook, whereby said hooks may be picked up by the blades and transferred to said chute, substantially as set forth.

In testimony whereof I affix my signature in presence of two witnesses.

JOHN J. NORWELL.

Witnesses:
F. W. SMITH, Jr.,
J. S. FINCH.